United States Patent [19]

Schwee

[11] 3,868,660

[45] Feb. 25, 1975

[54] DETECTOR FOR CROSS-TIE MEMORY

[75] Inventor: Leonard J. Schwee, Colesville, Md.

[73] Assignee: The United States of America as represented by the Secretary of the Navy, Washington, D.C.

[22] Filed: Apr. 10, 1973

[21] Appl. No.: 349,897

[52] U.S. Cl. .......................... 340/174 TF, 340/174 SR

[51] Int. Cl. .......................... G11c 11/14, G11c 21/00

[58] Field of Search .. 340/174 TF, 174 MS, 174 SR

[56] References Cited

UNITED STATES PATENTS

| | | | |
|---|---|---|---|
| 3,114,898 | 12/1963 | Fuller | 340/174 TF |
| 3,129,412 | 4/1964 | Lovell | 340/174 MS |
| 3,138,789 | 6/1964 | Pugh | 340/174 MS |
| 3,176,276 | 3/1965 | Smith | 340/174 TF |
| 3,482,219 | 12/1969 | Gratian | 340/179 MS |

OTHER PUBLICATIONS

IBM Technical Disclosure Bulletin – Vol. 13; No. 10; Mar. 1971, pg. 3021.

*Primary Examiner*—James W. Moffitt
*Attorney, Agent, or Firm*—R. S. Sciascia; J. A. Cooke; Sol Sheinbein

[57] ABSTRACT

An arrangement for detecting binary information stored in the form of inverted Neel walls in a magnetic serial access memory. A sensing probe above the memory detects variation in the magnetization due to creep as Bloch lines and cross-ties are propagated in the multivibrator to indicate an inverted Neel wall segment.

5 Claims, 7 Drawing Figures

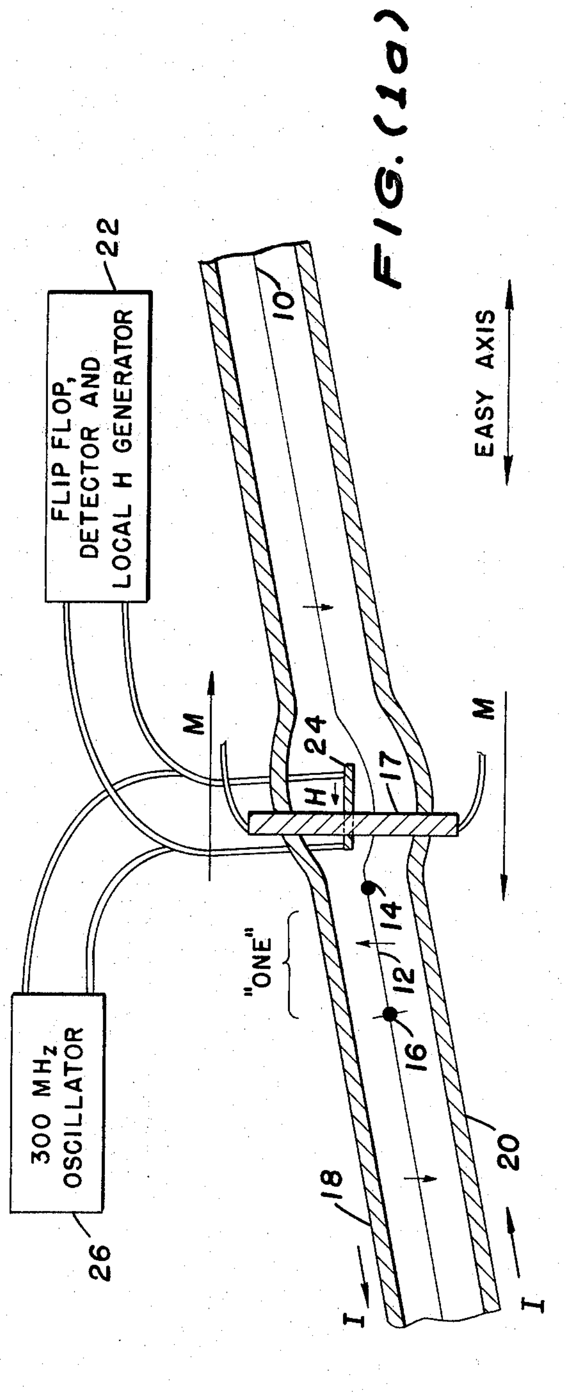
FIG. (1a)
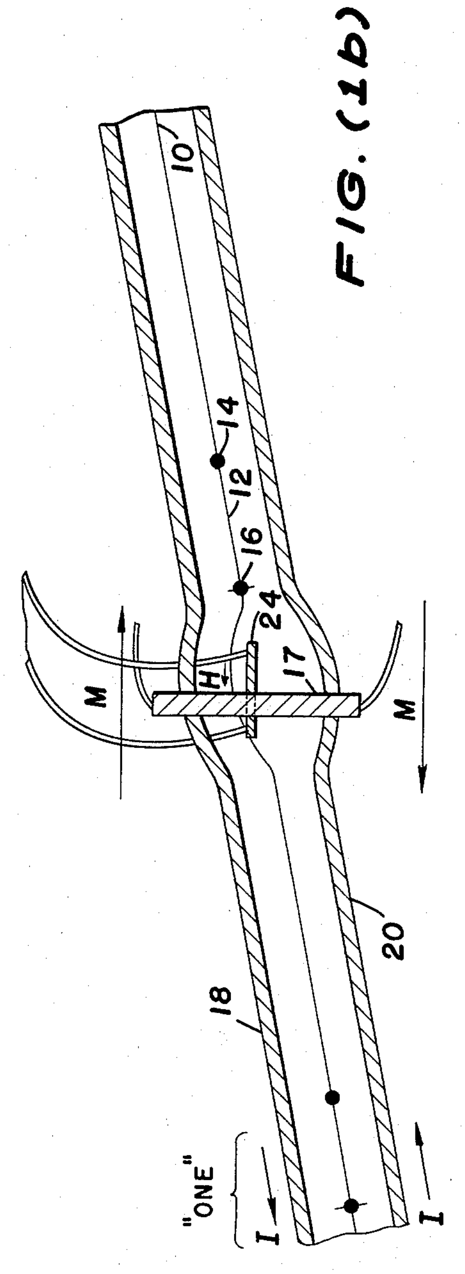
FIG. (1b)

DETECTOR FOR CROSS-TIE MEMORY

BACKGROUND OF THE INVENTION

This invention relates to a magnetic readout device and more specifically to a fast readout of digital information stored in domain walls in the form of inverted Neel walls in a serial access memory.

In copending U.S. Patent application Ser. No. 349,871 filed Apr. 10, 1973, to Leonard J. Schwee, there is described an arrangement for propagating digital information contained in a poly-crystalline material extremely fast. The reader is directed to said application for a complete disclosure of the arrangement and its advantages. Briefly, there is described a serial access memory on a magnetic thin film such as 320 A of 80-20 Ni-Fe composition. Only the data moves in the domain walls formed therein with the recording and pickup heads and the film remaining stationary. The domain walls are placed on the film by applying currents through wires placed over the film. The digital information is read into the memory by placing a fine wire above and parallel to the domain wall and applying a current pulse of proper polarity to invert the Neel wall, form Bloch lines and cross-ties. The digital information stored in the wall is moved along it by varying the field produced by conductors placed above the domain wall, causing movement of the Bloch lines and relocation of the cross-ties along the wall.

Obtaining a detectable signal from such a small magnetic phenomena is difficult without a means of "magnetic amplification."

SUMMARY OF THE INVENTION

Accordingly, this invention provides a fast readout arrangement for a serial access memory device. As the Bloch lines and cross-ties are propagated past the detector, a small localized field at the detector causes creep as a result of wall reversal, in the domain wall. The creep phenomena enables a wire detector to sense a variation in the ferromagnetic resonance, indicating the presence of a "one" for example, triggering a flip flop in a detector unit. The flip flop also reverses the localized local field, enabling the detector to sense ensuing wall reversals.

OBJECTS OF THE INVENTION

It is therefore an object of the present invention to provide a detector for a serial access magnetic memory.

Another object of the present invention is to provide a readout for inverted Neel walls in domain walls.

Yet another object of the present invention is to provide magnetic amplification of cross-ties and Bloch lines utilizing the phenomenom of creep and magnetic resonance.

A still further object of the present invention is to provide a readout device capable of detecting a microscopic magnetic event.

Yet another object of the present invention is to provide an extremely fast serial readout for a memory device.

Yet another object of the present invention is to provide a compact and inexpensive magnetic detection device.

BRIEF DESCRIPTION OF THE DRAWINGS

Still other objects of the present invention will become apparent to those of ordinary skill in the art by reference to the following detailed description of exemplary embodiments of the apparatus and the appended claims. The various features of the exemplary embodiments according to the invention may be best understood with reference to the accompanying drawings, wherein:

FIGS. 1(*a*) and 1(*b*) are schematic illustrations of the detection arrangement in accordance with the invention showing consecutive magnetic configurations therein;

DESCRIPTION OF THE PREFERRED EMBODIMENTS

Figure 2A:
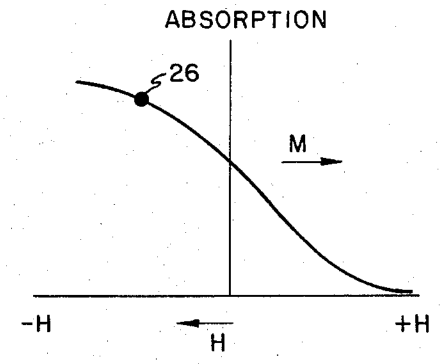
FIGS. 2(*a*), 2(*b*), 2(*c*) and 2(*d*) are plots of absorption versus applied localized field during the detection process.
Figure 2B:
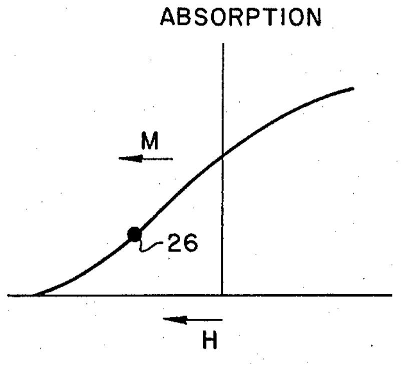
Figure 2C:
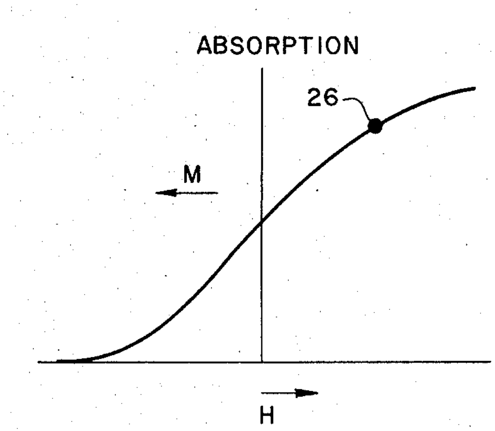
Figure 2D:
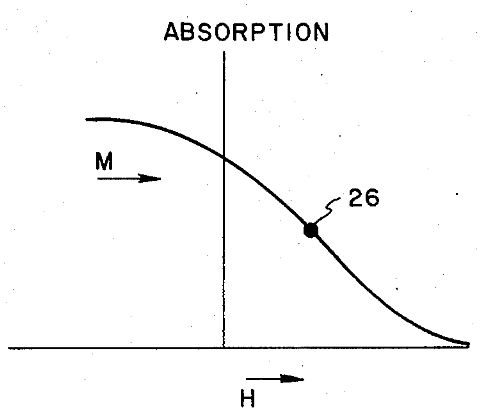

Bloch line motion and the nucleation of inverted sections cause creep. Creep is the rapid jump of the wall over a short distance in a direction normal to wall length and thickness. Creep occurs if an easy axis field is present during polarity reversal of the wall. The easy axis field makes the enlargement of a domain on one side of the wall favorable, and contraction favorable on the other side of the wall. During the time while the wall is reversing polarity (about 2 nsec or less) the wall is in some undefined state which differs from the normal wall. When the wall reforms, it will have moved so that the favored domain grows and the other shrinks. The wall can move up to about 25 $\mu$ during this reversal. The wall motion due to creep is then useful for detection.

Referring now to FIG. 1(*a*), there is shown a domain wall 10 containing an inverted Neel wall segment 12 between Bloch line 14 and cross-tie 16 propagating along the wall. The large vectors M show the direction of magnetization on each side of the wall along the easy axis. The domain wall 10 is in a low energy position defined by the fields produced by conductors 18 and 20 which are placed at an angle to the easy axis. The wall can also be held in position by paths of low coercivity. For example, if a glass substrate is coated with aluminum, and the aluminum is etched away along paths, the film will have low coercivity on the glass substrate and high coercivity on the aluminum substrate. The walls can be trapped along the low coercivity paths. Also high coercivity material can be deposited over portions of the films, of 80-20 Ni-Fe or other suitable material, where walls are not desired. The propagation fields are applied along the hard axis so that neither domain is favored. During memory operation a small current through the wires holds the wall in place.

At the detector 22, a small local easy axis field H is applied by conductor 17 which favors creep. When Bloch line 14 motion and cross-tie 16 relocation, as explained in copending U.S. patent application Ser. No. 349,871 filed Apr. 10, 1973, for Leonard J. Schwee, occurs in the presence of this field, creep occurs when the inverted Neel wall segment 12 traverses the region under the influence of field H and the wall 10 moves as shown in FIG. 1(*b*). The change in magnetization caused when creep occurs is detected by sensing probe 24, which may be a short section of wire. The detection triggers a flip flop (not shown) in detector 22 which changes the direction of the local easy field H. The probe 24 is "cocked" and ready to detect the next "one" bit to come along to cause creep, resulting in a change in the absorption level which will trigger the flip flop to change the field H again. The local H producing wire (not shown) comprises a short wire placed above and perpendicular to sensing probe 24 and is coupled to the flip flop. Oscillator 26 can be used to provide a "tickling" field to the probe 24 if the change of flux beneath the probe 24 is not sufficient.

Figure 3:
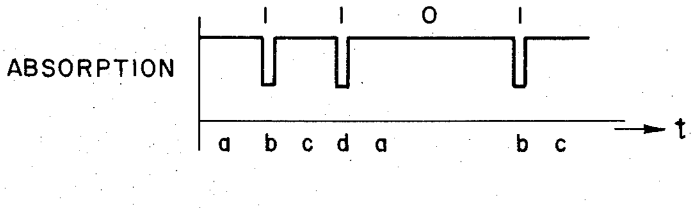
FIG. 3 illustrates the readout of the detection arrangement corresponding to the absorption.

The phenomenom used to detect the direction of magnetization by sensor probe 24 is ferromagnetic resonance. Referring now to FIG. 2 there is shown plots of absorption of resonance versus the local applied field H at 300 MHz. FIG. 2(*a*) corresponds to the time of operation when the detector 22 is awaiting a bit, such as inverted Neel wall 12 to pass by sensing probe 24 as illustrated in FIG. 1(*a*). As the Neel wall segment 12 passes sensing probe 24, the wall creeps and the magnetization below the wire changes direction causing the situation illustrated in FIG. 2(*b*). The dot on the curve 26 shows the amount of absorption that is detected by the probe 24 in each of the situations. The decrease in absorption which occurs when creep occurs as shown in FIG. 2(*b*) triggers the flip flop which changes the local field H so that the situation of FIG. 2(*c*) is obtained which corresponds to that point in time illustrated in FIG. 1(*b*). The circuit is set so that a decrease in absorption will trigger the flip flop, but an increase in absorption will not. When the next "one" bit passes the sensing probe 24, the wall 10 creeps back to its original location resulting in the situation illustrated in FIG. 2(*d*). The decrease in absorption then triggers the flip flop leading to the situation illustrated in FIG. 2(*a*). As illustrated in FIG. 3, if the absorption decreases, a 1 is read out; if it does not, a 0 is read out.

Another method of detection could involve an rf frequency detected on the local easy axis field wire. Oscillator 26 would drive sensing probe wire 24 at 300 MHz or some other high frequency, the signal would be detected on the perpendicular local easy axis field wire. The perpendicular wire would then carry both the local field current and the induced rf. The phase of the induced rf changes with the direction of M and the change in phase is detected, triggering the flip flop.

Thus it is apparent that there is provided by this invention a readout device capable of detecting a microscopic magnetic event. It is to be understood that what has been described is merely illustrative of the principles of the invention and that numerous arrangements in accordance with this invention may be devised by one skilled in the art without departing from the spirit and scope thereof.

What is new and desired to be secured by Letters Patent of the United States is:

1. Apparatus for detecting magnetic digital information comprising:
a stationary magnetic domain wall containing Bloch lines, cross ties and Neel wall segments propagating therein;
probe means above said domain wall; and
means for introducing a localized field at said probe, whereby said domain wall undergoes wall reversal motion to be sensed by a change of magnetization by said probe.

2. Apparatus as recited in claim 1 further including:
multivibrator means coupled to said probe means for receiving said sensed magnetization whereby said multivibrator triggers to cause said localized field to reverse into its opposite direction.

3. Apparatus as recited in claim 2 further including:
conductors carrying current on both sides of said domain wall creating fields to maintain said domain wall in its position.

4. Apparatus as recited in claim 3 wherein said localized field is in the easy axis direction and said probe comprises a wire.

5. Apparatus as recited in claim 4 further including oscillator means coupled to said probe means.

* * * * *